US009836564B1

(12) United States Patent
Zhang et al.

(10) Patent No.: US 9,836,564 B1
(45) Date of Patent: Dec. 5, 2017

(54) EFFICIENT EXTRACTION OF THE WORST SAMPLE IN MONTE CARLO SIMULATION

(71) Applicant: Cadence Design Systems, Inc., San Jose, CA (US)

(72) Inventors: Wangyang Zhang, Allison Park, PA (US); Hongzhou Liu, Sewickley, PA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 14/683,021

(22) Filed: Apr. 9, 2015

(51) Int. Cl.
  G06F 17/00  (2006.01)
  G06F 17/50  (2006.01)

(52) U.S. Cl.
  CPC ...... G06F 17/5022 (2013.01); G06F 17/5045 (2013.01)

(58) Field of Classification Search
  USPC .......................................................... 716/107
  See application file for complete search history.

(56) References Cited

U.S. PATENT DOCUMENTS

| 7,712,055 B2 | 5/2010 | Liu et al. |
| 8,195,427 B2 | 6/2012 | Tiwary et al. |
| 8,219,355 B2 | 7/2012 | Tiwary et al. |
| 8,479,126 B1 | 7/2013 | Liu et al. |
| 8,589,852 B1 | 11/2013 | Liu et al. |
| 8,813,009 B1 | 8/2014 | Liu et al. |
| 8,954,908 B1 | 2/2015 | Liu et al. |
| 8,954,910 B1 | 2/2015 | Liu et al. |
| 2007/0198956 A1* | 8/2007 | Liu ..................... G06F 17/5068 716/54 |
| 2009/0144671 A1* | 6/2009 | Liu ..................... G06F 17/5068 716/132 |

(Continued)

OTHER PUBLICATIONS

Silverman, "Using Kernel Density Estimates to Investigate Multimodality,"Journal of the Royal Statistical Society, Series B (Methodological), vol. 43, Issue 1, pp. 97-99, 1981.
McConaghy et al., "Variation-Aware Design of Custom Integrated Circuits: A Hands-on Field Guide," (Book: Chapter 4b), 4.3— Sigma-Driven Corner Extraction, Springer, 2013.

(Continued)

Primary Examiner — Mohammed Alam
(74) Attorney, Agent, or Firm — Andrews Kurth Kenyon LLP

(57) ABSTRACT

A system, method, and computer program product for reducing the number of Monte Carlo simulation samples required to determine if a design meets design specifications. The worst sample for each specification acts as a design corner to substitute for a full design verification. Embodiments determine the maximum number of samples needed, perform an initial performance modeling using an initial set of samples, and estimate the failure probability of each of the remaining samples based on the performance model. Embodiments then simulate remaining samples with a computer-operated Monte Carlo circuit simulation tool in decreasing design specification model accuracy order, wherein the sample predicted most likely to fail each specification is simulated first. Re-use of simulation results progressively improves models. Probability based stop criteria end the simulation early when the worst samples have been confidently found. A potential ten-fold reduction in overall specification verification time may result.

20 Claims, 4 Drawing Sheets

(56) References Cited

U.S. PATENT DOCUMENTS

| | | | | |
|---|---|---|---|---|
| 2009/0248387 A1* | 10/2009 | Singhee | ............. | G06F 17/5036 703/16 |
| 2012/0259446 A1* | 10/2012 | McConaghy | ....... | G06F 17/5022 700/104 |
| 2013/0226535 A1* | 8/2013 | Tuan | ................... | G06F 17/5036 703/2 |
| 2013/0226544 A1* | 8/2013 | Mcconaghy | ........ | G06F 17/5022 703/2 |
| 2013/0246986 A1* | 9/2013 | Kuo | ................... | G06F 17/5036 716/106 |
| 2013/0304439 A1* | 11/2013 | Van der Velden | .. | G06F 17/5009 703/6 |
| 2014/0258950 A1 | 9/2014 | Barker | | |

OTHER PUBLICATIONS

C. J. Clopper, E.S. Pearson, "The Use of Confidence or Fiducial Limits Illustrated in the Case of the Binomia", Biometrika, vol. 26, No. 4, (Dec. 1934), pp. 404-413.

Rasit Onur Topaloglu, "Early, Accurate and Fast Yield Estimation through Monte Carlo-Alternative Probabilistic Behavioral Analog System Simulations", Proceedings of the 24th IEEE VLSI Test Symposium (VTS'06), 2006, pp. 138-142.

Chenjie Gu, Jaijeet Roychowdhury, "An Efficient, Fully Nonlinear, Variability-Aware non-Monte-Carlo Yield Estimation Procedure with Applications to SRAM cells and Ring Oscillators", Proceedings of the 2008 Asia and South Pacific Design Automation Conference (AS-DAC'08), 2008, pp. 754-761.

Shupeng Sun, Xin Li, Hongzhou Liu, Kangsheng Luo and Ben Gu, "Fast Statistical Analysis of Rare Circuit Failure Events via Scaled-Sigma Sampling for High-Dimensional Variation Space", Proceedings of the International Conference on Computer-Aided Design (ICCAD'13), 2013, pp. 478-485.

* cited by examiner

EFFICIENT EXTRACTION OF THE WORST SAMPLE IN MONTE CARLO SIMULATION

CROSS-REFERENCE TO RELATED APPLICATIONS

This application is related to commonly-assigned patent application U.S. Ser. No. 14/581,958 entitled "EFFICIENT MONTE CARLO FLOW VIA FAILURE PROBABILITY MODELING", filed on Dec. 23, 2014. This application is also related to commonly-assigned patents "COMPUTING DEVICE MISMATCH VARIATION CONTRIBUTIONS", issued as U.S. Pat. No. 8,813,009 on Aug. 19, 2014, and "DEVICE MISMATCH CONTRIBUTION COMPUTATION WITH NONLINEAR EFFECTS", issued as U.S. Pat. No. 8,954,910 on Feb. 10, 2015. The aforementioned related application and related patents are hereby incorporated by reference in their entirety.

FIELD OF THE INVENTION

This description relates to the field of integrated circuit design, more specifically to circuit simulation, and yet more precisely to finding the worst Monte Carlo simulation sample for use as a design corner to substitute for a full design verification during design iterations.

BACKGROUND

The goals of integrated circuit design are not only to create a nominal circuit design that meets a set of predetermined specifications, but also to ensure that the circuit design can be manufactured reliably. Numerous sources of variation may cause some instances of a completed circuit design (e.g., fully simulated or fabricated microchips) to fail, that is, to not achieve at least one of the predetermined design specifications. (Quite often, "testing" actually refers to full simulation prior to actual fabrication; that nomenclature is adopted in this description for simplicity.) Designers therefore seek to model such variation to estimate and reduce the susceptibility of manufactured designs to such failure.

Many methodologies for modeling variation are known in the art, including but not limited to those described in the related patents previously incorporated by reference. Once an acceptably accurate variation model or "performance model" for a manufacturing process has been established, a number of Monte Carlo test samples may be selected according to the performance model and simulated to determine if particular design instances will fail. Even with recent advances in simulation technology however, performing a large number of Monte Carlo simulation runs of a design may still be computationally expensive.

When the performance model is sufficiently accurate, the problem of designing for manufacturability often shifts from estimating a yield to determining if the yield is above or below a yield target with a particular level of confidence. Monte Carlo simulation is therefore often used with a significance test, to check if a design's yield is above a particular yield target y with a confidence level c. Higher confidence levels denote an increased sureness that a particular outcome is not due to chance.

When a yield target is high, verifying the yield requires a large number of samples when the actual yield is above or only slightly below the target yield. For example, a three-sigma Gaussian process corresponds to only a 0.13% probability of a failure occurring. Thus, because failures are so rare for such processes, many samples that do not fail will occur before one that does. If the actual yield of a manufactured design is one, so no failures actually occur, verifying that the yield exceeds the three-sigma level, e.g., 99.87%, requires the following approximate number of samples for the confidence levels shown:

| CONFIDENCE LEVEL | NUMBER OF SAMPLES |
| --- | --- |
| 80% | 1200 |
| 90% | 1700 |
| 95% | 2200 |

Reducing the number of Monte Carlo simulation samples required to confidently compare a yield to a target yield is therefore important for final overall design verification. In the related patent application incorporated by reference above, embodiments estimate the overall failure probability of a number of statistical samples based on a performance model, then simulate the samples in decreasing failure probability order. This approach helps ensure that those samples most likely to fail will be simulated first, thus reducing the number of Monte Carlo simulation samples required to determine if a design yield is above a given yield target with a given confidence.

Many design iterations may occur however before a completed design is ready for a final overall yield verification that involves checking that all of the design specifications have been met. Designers instead often focus on one particular design specification at a time when developing and adjusting various portions of a circuit design. This approach helps designers "divide and conquer" the overall design problem into intuitively manageable aspects. Designers may thus frequently need to quickly determine if a design will meet a particular design specification even in the worst case variation scenario for that design specification.

To that end, rather than run a full Monte Carlo verification of an entire set of design specifications during each design iteration, designers may instead test a design to see if it meets a particular design specification properly in the most demanding design corner. Designers therefore need to reliably extract the worst statistical sample for a given design specification at the minimum computational expense. Designers may for example be able to trade off different aspects of circuit performance to help meet a more difficult design requirement, but they need to know the limits of such an exchange.

Further, if a circuit design is able to meet each design specification separately under the worst conditions for that specification during a given design iteration, the design is more likely to later meet an overall yield target that considers all design specifications together. That is, if even the worst combinations of inputs cannot make the circuit operate improperly in a given way, it will be more likely that nothing can. Conversely, any failure to meet a particular design specification is likely to doom the circuit design to failure when a full verification that checks all the design specifications is attempted.

Accordingly, the inventors have developed a novel way to help circuit designers and design tool vendors find the worst Monte Carlo simulation sample for use as a design corner to substitute for a full design verification during design iterations.

DETAILED DESCRIPTION

Figure 1:
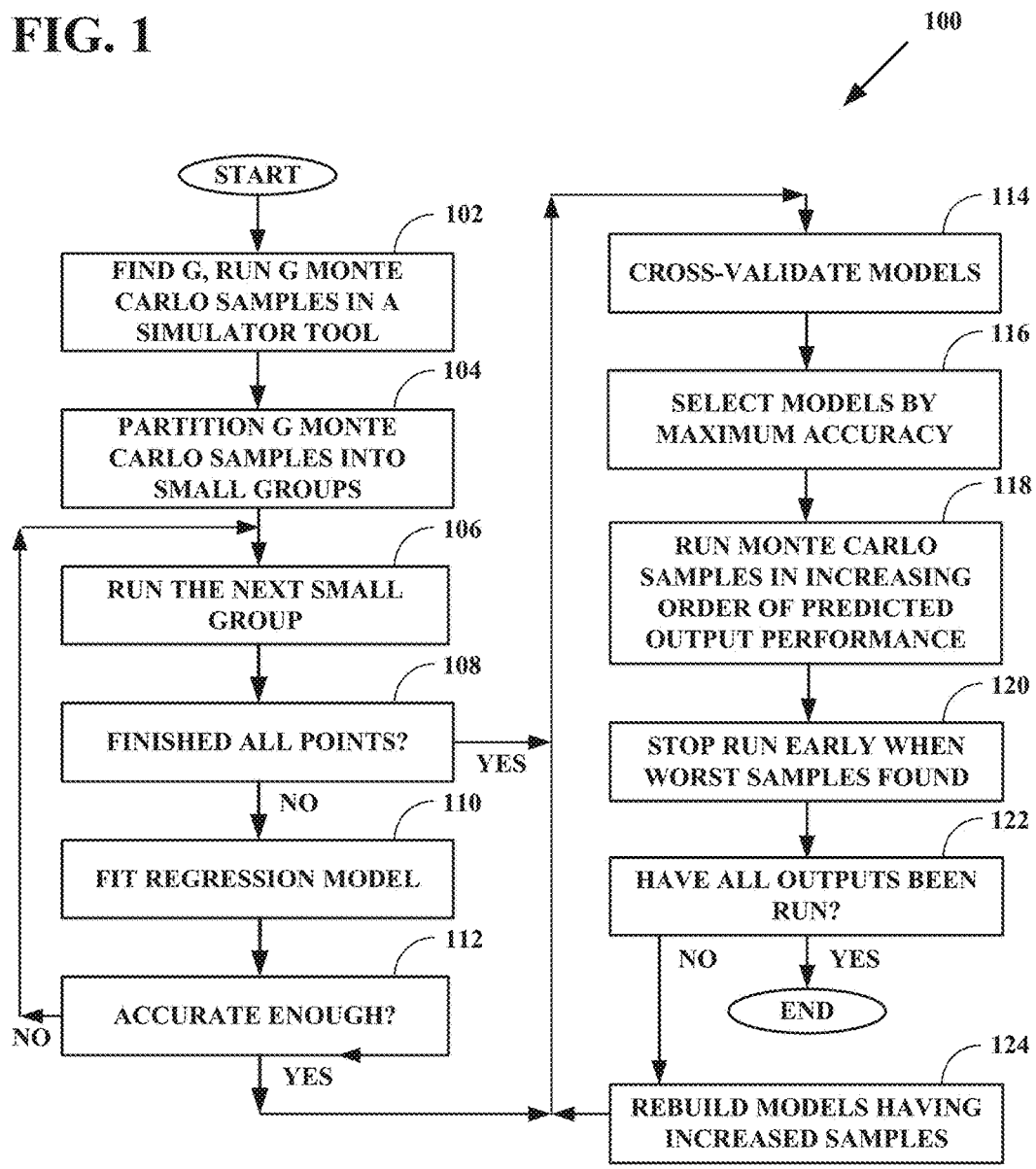
FIG. 1 is a flowchart of an efficient worst sample Monte Carlo validation flow 100, according to an embodiment.

This description presents a system, method, and computer program product for finding the worst Monte Carlo simulation sample for use as a design corner to substitute for a full design verification during design iterations. Although this description is written in terms of integrated circuit design, the invention is not limited to that application, but may be applicable to any statistically characterized process to identify design failures. The method enhances performance and efficiency of a design verification system employing the method. Designs surviving the verification process may then be translated into manufacturable descriptions of circuits, ultimately for physical fabrication of those circuits.

In situations where a process yield is high and a large number of non-failing design instances must be tested before finding a relatively small number of failing design instances, the most efficient way to count the failing instances would be to have them all occur first. Counting the non-failing instances after enough failing instances have been counted to determine if a yield target has been met would essentially be a waste of computational effort and thus ideally is avoided. Such a happy coincidental outcome is normally unlikely of course, since the particular variations that cause failures are rare. For example, failures might occur only when multiple input factors are each at an extremely unusual value in some particular combination, e.g., at so-called "worst case corners".

Embodiments of the present invention, however, deliberately arrange for the design instances that fail to meet a particular design specification to occur first, so that only that one sample need actually be tested for each design specification. The result may be a remarkable reduction in the overall number of instances that must be tested to verify (e.g., prove or disprove) that a particular design specification will be met. Since designers often intuitively adjust a circuit design to meet one design specification after another separately, designers may well find the identification of the worst instances for each design specification to be very helpful during design iterations. Typical design specifications may provide requirements for current, gain, bandwidth, logic switching speed, power dissipation, or any other aspect of circuit performance as would be readily understood by a person of ordinary skill in the art. A corresponding reduction in the overall computational expense of such design specification verification may also be provided, typically ten-fold or more in some moderate-yield test cases in comparison to a full Monte Carlo based design verification. The increase in system efficiency should be apparent.

The overall methodology has three major aspects. First, embodiments may determine the maximum number of overall points needed to verify design yield based on a yield target and a specified confidence level. Embodiments may begin by performing an initial Monte Carlo simulation of the design to build a performance model. Constructing the performance model may consume a predetermined portion of a total number of budgeted simulations, e.g., 25 percent. Any known method of building a performance model for a statistically varying process may be considered within the scope of the present invention. Some embodiments may employ the methodologies described in the related patents previously incorporated by reference. One embodiment may perform a binary search based on Clopper-Pearson confidence intervals based on a good heuristic starting point, to be described.

Embodiments may then estimate the failure probability of each of the remaining samples based on the performance model. That is, if a production process is relatively well characterized by the performance model, then that performance model may be relied on to accurately predict which of the future test samples will actually fail to meet a particular design specification. For example, the performance model might recognize when multiple important factors are at extremely unusual value combinations that have been correlated with failures. Embodiments may thus capitalize on the computational investment required to build a performance model by using its predictions to minimize larger future computational expenses.

Second, embodiments may extract the worst sample for each design specification. Embodiments may process design specifications in order of model accuracy, so that the most accurately modeled design specification is processed first. The probability of finding the few samples that will fail before going through many samples that will not fail may be greatly increased by first testing those statistical samples that are most accurately deemed most likely to fail. Thus, the better the performance model tracks the actual process variation, the greater the chance that failing instances will be predicted and tested first.

Further, some embodiments may dynamically adjust the order of design specification processing to re-use sample data to rebuild and improve the models used for the design specifications. This approach saves simulations because the most accurate output is likely to converge with fewer samples, also enhancing system efficiency. Those design specifications that are least accurately modeled initially may become more accurately modeled when the additional data gathered during processing of the other design specifications becomes available for consideration. The usefulness of the additional data for one design specification may depend on the type of simulation required to process another design specification. For example, verification of some design specifications may require ac simulation while verification of others may require transient simulation, so additional ac simulation results may be useful for rebuilding the model for design specifications based on ac simulation results, etc.

This separate design specification processing arrangement also helps ensure that each separate design specification is given some design consideration without as much influence from the initial difficulty of modeling that particular design specification. Some design specifications may also be much more difficult to meet than others, so this approach avoids adverse design tradeoffs wherein a designer may trade design performance unnecessarily just to meet an initially poorly modeled but easy design specification. The end result may be a more robust circuit design that is better centered in all important design dimensions.

Third, embodiments may use probability based stop criteria to stop when the worst sample has been confidently found for each design specification. If the probability of any remaining sample being worse than the currently worst sample found so far is sufficiently low for a given design specification, then further sampling would very probably be unproductive. Note this is a different scenario than determining if an adequate number of design specifications have been processed to verify an overall yield target; here each design specification is compared to a corresponding simulation output. Further, the stop criteria for each design specification may need to consider the reordering of samples that may occur in the embodiments that re-use data from one design specification verification for the verification of another design specification.

FIG. 1 shows a flowchart of an efficient worst sample Monte Carlo yield validation flow 100, according to an embodiment. The different aspects of the overall methodology are now described in more detail in terms of particular method steps in this figure. The first major aspect of the overall methodology is to determine the maximum number of overall points needed to verify design yield based on a yield target and a specified confidence level. An embodiment may calculate an initial number G of Monte Carlo samples as a first step 102 in developing a performance model for the manufacturing process. An embodiment may determine the initial number G of Monte Carlo samples from a minimum sample count needed such that a given overall yield target y is met with a given confidence level c if all the samples in the minimum sample count pass. This is also the maximum number of samples needed to extract the worst sample.

Let f(G, c) be the Clopper-Pearson lower bound when all samples pass, where the number of samples is G, and alpha is 1−c. An embodiment may solve for G such that f(G, c)≥y and f(G−1, c)<y; that is, G would be large enough that sufficient samples would be found to confidently meet or exceed the overall yield target, yet if one less sample were taken, the overall yield target would not be met with the same confidence. A good heuristic for finding an upper bound for G is to estimate it as 1/(1−y).

An embodiment may apply the following process to find G using a binary search and the estimated upper bound for G:

Initialize LowerBound=0, UpperBound=1/(1−y)
While f(UpperBound, c)<y
    LowerBound=UpperBound
    UpperBound=2*UpperBound
End
Perform binary search between (LowerBound, UpperBound) to find G The binary search typically takes a very small number of iterations, since 1/(1−y) tends to be a good initial guess for the number of samples needed. This methodology for determining G is believed to be better than relying on unguided user specification of G.

At 104, the G Monte Carlo samples may be partitioned into a number of small groups, e.g., four. A number of these groups may then be used as needed for developing the performance model that is deemed to be sufficiently accurate. In one embodiment, the development of the performance model may follow the methodologies of at least one of the previously incorporated patents. Broadly speaking, those methodologies may estimate whether a fitted model is sufficiently accurate, and may selectively increase model complexity to achieve sufficient accuracy.

Briefly, the performance model may be developed in one embodiment by following the left side of the FIG. 1 flowchart. The performance model development flow of this embodiment involves iteratively fitting points from one of the small group of samples to a regression model (at 110), determining if the regression model is sufficiently accurate (at 112), and if not then using another small group of samples to improve the regression model as needed (at 106). If all the points of a small group of samples allocated for development are used, the performance model development process may exit (at 108). That is, the performance model may be as good as it can get for the available data budget. However, if the regression model is deemed sufficiently accurate before all the allocated points are used, the performance model development process may end early, e.g., without using either additional points or another of the small groups of samples (again, at 112). Embodiments of the accuracy-based stop feature shown in FIG. 1 item 112 are described in more detail in the previously incorporated related patents, but essentially they estimate accuracy as a logarithmic function of the number of input data samples and mismatch parameters, and selectively increase regression model complexity as needed.

The total number of Monte Carlo samples allocated for the entire methodology may include the samples to be potentially used for performance model development and the remaining samples to be potentially used for testing the predicted design specification failures. The total number of samples may also be limited by the time and computational resources available. However, as noted above the performance model development process may finalize after requiring far fewer than G samples to achieve sufficient accuracy. The extraction of the worst sample for each of the design specifications may also finalize early, as will be described. Early process stopping for either case may thus speed the end result of the worst sample extraction process well beyond conventional brute force methods.

After the initial Monte Carlo simulation, each design specification $y_i$ may be approximated by a model, $$y_i = f_i(x) + \epsilon_i \qquad \text{(Eqn. 1).}$$

where x represents all statistical parameters, $f_i(x)$ is a linear, quadratic, or higher order function of a response surface methodology, and $\epsilon_i$ is a random error term. The error term $\epsilon_i$ may be modeled by a standard normal distribution, $$\epsilon_i \sim N(0, \sigma_i^2) \qquad \text{(Eqn. 2).}$$

which is the Bayesian interpretation of a model fitting that minimizes the L2-norm of the residual. For any parameter set $x_j$, the actual performance $y_{ij}$ thus satisfies the distribution $$y_{ij} \sim N(f_i(x_j), \sigma_i^2) \qquad \text{(Eqn. 3).}$$

The standard deviation $\sigma_i$ for each design specification $y_i$ may be estimated by cross-validation between the small groups of samples, to be described.

The subsequent aspects of the methodology may begin once a sufficiently accurate performance model is available, which may for example result from performance model creation methods described in the previously incorporated patents. When performing an overall design yield validation, the remaining Monte Carlo samples would be used for subsequent yield testing, which involves evaluating all design specifications. However, for the present task of finding the worst sample for each design specification, the total number of simulations involved may be quite different for different design specification evaluation orderings. That is, a simulation for a given design specification that is the most accurately modeled is likely to use the lowest number of samples to confidently find its worst sample, while other less accurately modeled design specifications will probably require more samples to confidently find their worst samples. One possible embodiment could merely generate the remaining Monte Carlo samples and simulate each design specification independently using the initial Monte Carlo model. However, a different strategy now provided may lead to significant reductions in the total number of simulations required.

The second major aspect of the methodology is to extract the worst sample for each design specification. Embodiments of the different strategy may thus begin a process of dynamically adjusting the order in which design specifications are processed. At 114, after the initial sampling, embodiments may use cross-validation to estimate the model accuracy of each design output that is to be compared to its design specification. Further detail on cross-validation is provided regarding FIG. 2.

At 116, embodiments may reorder the processing of the design specifications to proceed according to the current highest model accuracy. At 118, embodiments may use a computer-operated simulator tool to simulate samples of the reordered design output having the highest model accuracy first, since this approach is likely to use the lowest number of samples among all the eventual samples. One embodiment may estimate model accuracy according to the coefficient of determination $R^2$, to be described. The worst sample predicted for each modeled design specification is run first, followed by others that are less likely to produce inadequate outputs that do not meet the particular required specification. At 120, embodiments may stop the Monte Carlo worst case extraction methodology early when the worst samples are confidently found. Further detail on the stop criteria, including adjustments made to factor in model reordering are described below.

At 122, embodiments may determine if all the allocated outputs have been run, in which case the methodology exits. If not, then at 124 embodiments may update or rebuild the models for which samples have increased, which may for example be the case for design outputs that require the same test set. For example, an ac simulation may determine both gain and bandwidth design outputs for comparison against their separate design constraints. By reordering to simulate gain first, additional ac simulation samples may be acquired for better modeling of bandwidth. After finishing the worst sample extraction for each output, embodiments may obtain additional samples for other outputs of the same test. Embodiments may thus rebuild the model for such outputs and re-estimate the model accuracy given the additional samples at 114, and then proceed to 116 for further reordering of the design specifications and simulating of the reordered samples.

The coefficient of determination $R^2$, which may be considered a goodness-of-fit for a linear regression model, may be defined as:

$$R^2(y \sim x_1, \ldots, x_N) = 1 - \frac{\text{Var}(\varepsilon)}{\text{Var}(y)} \quad \text{(Eqn. 4)}$$
$$= \frac{\text{Var}(a_1 x_1 + a_2 x_2 + \ldots + a_N x_N)}{\text{Var}(y)}.$$

where Var( ) means sample variance. In other words, $R^2$ is a measure of what percentage of the performance measure variation may be explained by the N regressors in the model.

After building the model of each design output, the value of $R^2$ for each model may be calculated as:

$$R_i^2 \sim 1 - \left(\frac{\sigma_i^2}{\text{var}(y_i)}\right). \quad \text{(Eqn. 5)}$$

where $\text{var}(y_i)$ is the sample variance of $y_i$. Extracting the worst sample of the output with the maximum $R^2$ value may comprise running a Monte Carlo process by reordering the samples from the worst to best based on predicted values $f_i(x)$ of the output. That is, for each of the design specifications, embodiments may extract the worst sample via reordered runs, e.g., one for each design specification.

The third major aspect of the methodology is to use probability based stop criteria to stop when the worst sample has been found with sufficient confidence for each design specification. Embodiments may thus stop their simulation when there is sufficient confidence that none of the remaining samples will be worse than the currently worst sample. The currently worst sample includes those found during both the initial sampling for building the performance model and during the reordered simulation runs. The probability of sample j of output i being better than the current worst sample with value $w_i$ may be calculated by:

$$P_{ij} = \frac{1}{2}\left(1 + \text{erf}\left(\frac{d_{ij}}{\sigma_1 \sqrt{2}}\right)\right). \quad \text{(Eqn. 6)}$$

where erf is the error function, and $d_{ij}$ is the distance of the predicted value of sample j to the current worst value $w_i$.

The probability of finding the worst sample is equal to the probability that each of the unsimulated M samples is better than the current worst sample:

$$P_i = \prod_{j=1}^{M} (P_{ij}) = \frac{1}{2^M} \prod_{j=1}^{M} \left(1 + \text{erf}\left(\frac{d_{ij}}{\sigma_1 \sqrt{2}}\right)\right). \quad \text{(Eqn. 7)}$$

The Monte Carlo run may stop when this probability is sufficiently large, and tangibly output results for review by the designer. The value of $d_{ij}$ is equal to $w_i - f_i(x_j)$ if the worst sample is the largest sample, and $d_{ij}$ is equal to $f_i(x_j) - w_i$ if the worst sample is the smallest sample. The values of both $d_{ij}$ and $w_i$ may change over time, and each is involved in computing the probability that a given sample is better than the currently simulated sample. The probability of finding the worst sample is thus quite dynamic.

Further, experiments indicate that the model error may be larger when modeling extreme samples, and thus the initial value of $\sigma_i$ from the initial samples used to build the performance model may not be large enough to capture this increased error. The initial samples are randomly chosen, so each has a similar chance of selection. But in the reordered simulation runs, embodiments of the methodology are sampling the tail of the distribution so to speak. The initial value of $\sigma_i$ may be inaccurate, so such a discrepancy is considered via adjusted stop criteria for reordered samples.

Embodiments may therefore estimate an adjusted error standard deviation while running the reordered Monte Carlo samples for design specification i by:

$$\sigma_i' = \sqrt{\left(\frac{1}{K}\sum_{j=1}^{K}(y_{ij} - f_i(x_j))^2\right)}. \quad \text{(Eqn. 8)}$$

where K is the number of finished samples in the reordered Monte Carlo run for design specification i. The embodiments may therefore increase the error estimate of a model when the adjusted standard deviation $\sigma_i'$ for reordered values is larger than the original estimate $\sigma_i$, for example by taking the larger of the two values. Since the samples are reordered to run from worst to best, this approach captures the model accuracy at a worst subset of samples, which should be more realistic and thus provide more reliable stop criteria:

$$P_i = \frac{1}{2^M} \prod_{j=1}^{M} \left(1 + \text{erf}\left(\frac{d_{ij}}{\max(\sigma_i, \sigma'_i)\sqrt{2}}\right)\right). \quad \text{(Eqn. 9)}$$

Figure 2:
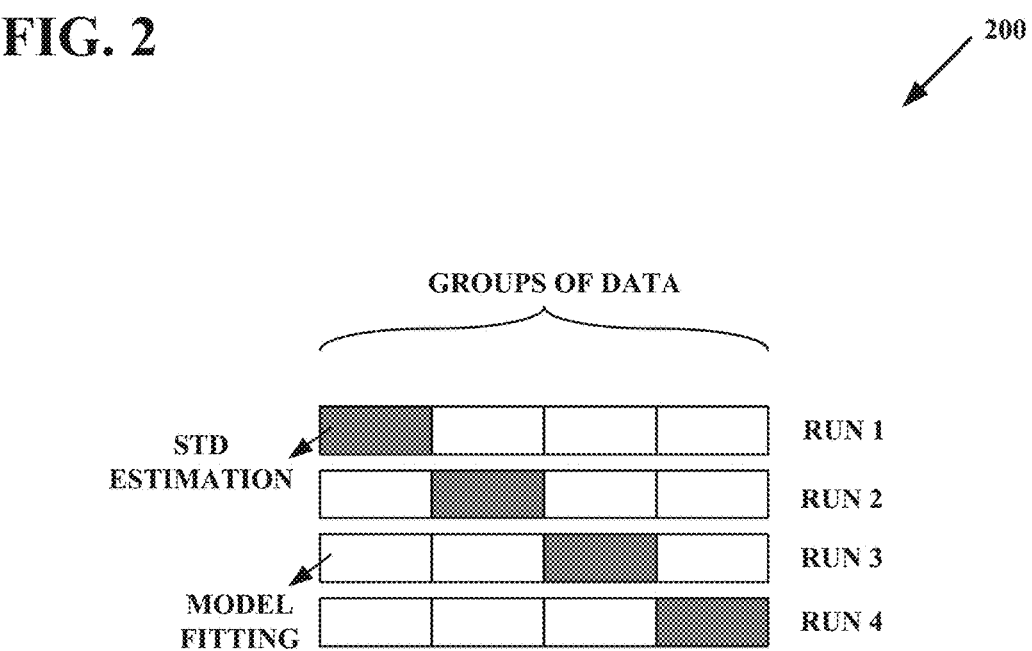
FIG. 2 is a diagram of a data grouping 200 for cross-validation, according to an embodiment.

FIG. 2 shows a diagram of a data grouping 200 for cross-validation, according to an embodiment. In this embodiment, the standard deviation $\sigma_i$ may be estimated by cross-validation. Data from the completed Monte Carlo simulations may be divided into four exemplary groups used for verifying the regression model's standard deviation estimate and for actual regression model fitting. In each of the exemplary four separate simulation runs, a different data group may be used for independent standard deviation estimation (shown in gray), while the remaining data groups may be used for the model fitting. Each of the four exemplary simulation runs will thus have its own particular residual, and the standard deviation may be estimated as $$\sigma_i = \text{std}(\{\text{residual}_1, \text{residual}_2, \text{residual}_3, \text{residual}_4\}) \quad \text{(Eqn. 10)}.$$

Use of four to ten separate simulation runs may be typical to reasonably trade off between achieving a consistent $\sigma_i$ estimate and computational cost. The estimated value of $\sigma_i$ is typically larger than the true $\sigma_i$, since for an F-fold cross-validation, the error is estimated by only an (F−1)/F portion of the data. The cross-validation process may be repeated on additional data as needed, until sufficient model accuracy is achieved.

An exemplary two-stage operational amplifier designed in a typical 45 nm process was the subject of experiments to test the worst sample extraction methodology. The experiments measured eight performance specifications, including current, unity gain frequency, gain, random offset, swing, settling time, relative swing percentage, and phase margin. Both ac and transient simulations are required to determine these outputs. The test objective is to find the worst sample for each output based on the verification condition of 99.87% yield with 95% confidence. Meeting this objective with normal yield verification processes normally requires more than 2300 points and more than 4600 simulations. Embodiments of the worst sample extraction methodology described above stop after only 260 simulations, with the worst sample for each output correctly found. These results represent nearly an 18× increase in speed compared to running a Monte Carlo simulation directly.

An exemplary differential operational amplifier designed in a typical 90 nm process was the subject of further experiments to test the worst sample extraction methodology. The experiments measured five performance specifications, including current, gain, random offset, slew rate, and settling time. Both ac and transient simulations are required to determine these outputs. The test objective is again to find the worst sample for each output based on the verification condition of 99.87% yield with 95% confidence. Meeting this objective with normal yield verification processes again normally requires more than 2300 points and more than 4600 simulations. Embodiments of the worst sample extraction methodology described above stop after only 808 simulations, with the worst sample for each output again correctly found. Random offset is defined as the absolute difference of two inputs, so it is strongly nonlinear, yet these results still represent nearly a 6× increase in speed, and consequent system efficiency and performance, compared to running a Monte Carlo simulation directly.

Figure 3:
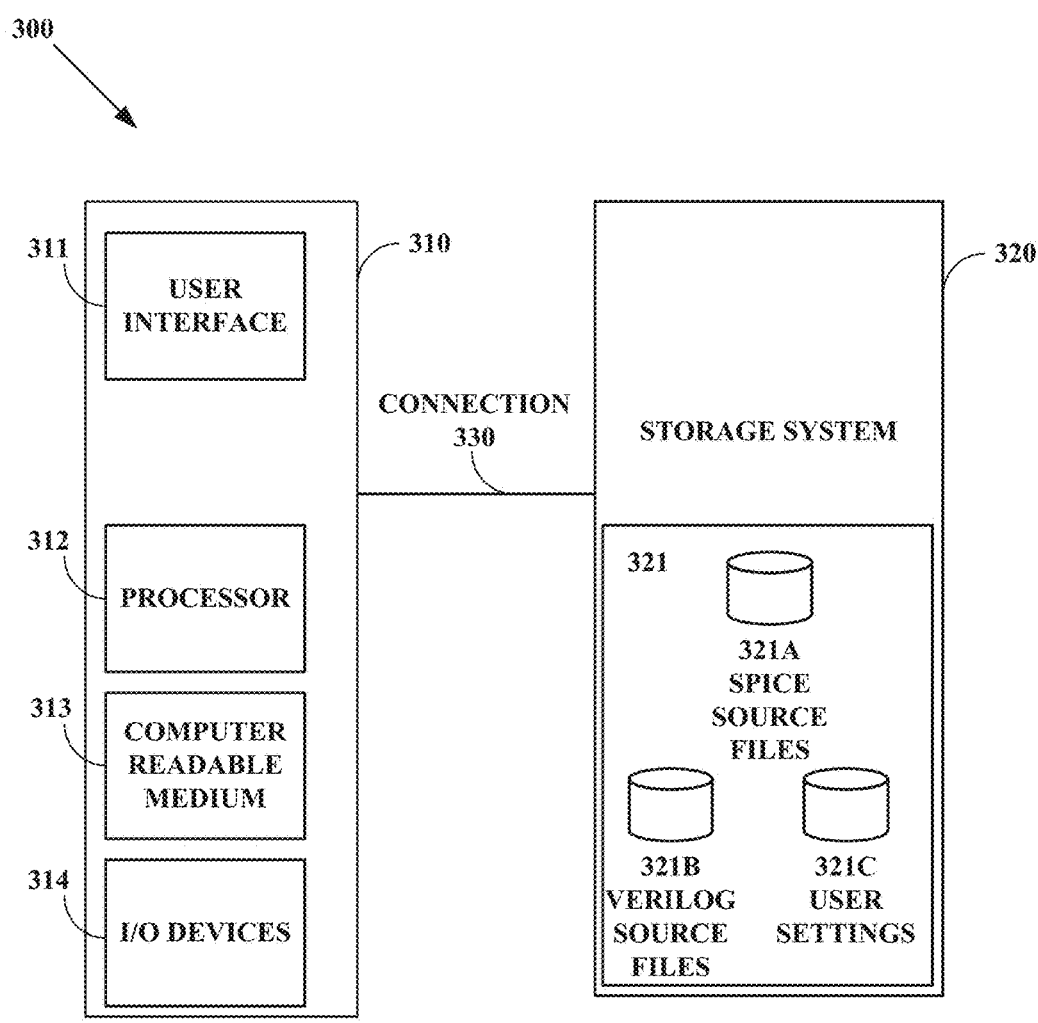
FIG. 3 is a block diagram of a circuit analysis system 300, according to an embodiment.

FIG. 3 shows a block diagram of an exemplary circuit analysis system 300, according to an embodiment. This system may provide simulator functionality for any of the methods described above. A user may access the system 300 through a standalone client system, client-server environment, or a network environment. System 300 may comprise one or more clients or servers 310, one or more storage systems 320, and a connection or connections 330 between and among these elements.

Client 310 may execute instructions stored on transitory or non-transitory computer readable medium 313 with processor 312, and may provide a user interface 311 to allow a user to access storage system 320. The instructions may be part of a software program or executable file that may operate electronic design automation (EDA) software. Client 310 may be any computing system, such as a personal computer, workstation, mobile computer, or other device employing a processor which is able to execute programming instructions. User interface 311 may be a graphical user interface (GUI) run in a user-controlled application window on a display. A user may interact with user interface 311 through one or more input/output (I/O) devices 314 such as a keyboard, a mouse, or a touch screen.

Storage system 320 may take any number of forms, including but not limited to a server with one or more storage devices attached to it, a storage area network, or one or a plurality of non-transitory computer readable media. Databases 321 may be stored in storage system 320 such that they may be persistent, retrieved, or edited by the user. Databases 321 may include SPICE source files 321A, Verilog source files 321B, and a user input database 321C for example. These databases may be kept as separate files or systems, or may be merged together in any appropriate combination.

Only one client 310 is shown connected to storage system 320 through connection 330, which may be a simple direct wired or wireless connection, a system bus, a network connection, or the like, to provide client 310 with access to storage system 320. In another aspect, connection 330 may enable multiple clients 310 to connect to storage system 320. The connection may be part of a local area network, a wide area network, or another type of network, again providing one or more clients with access to storage system 320. Depending on system administrator settings, client 310's access to system storage 320 or to other clients may be limited.

Figure 4:
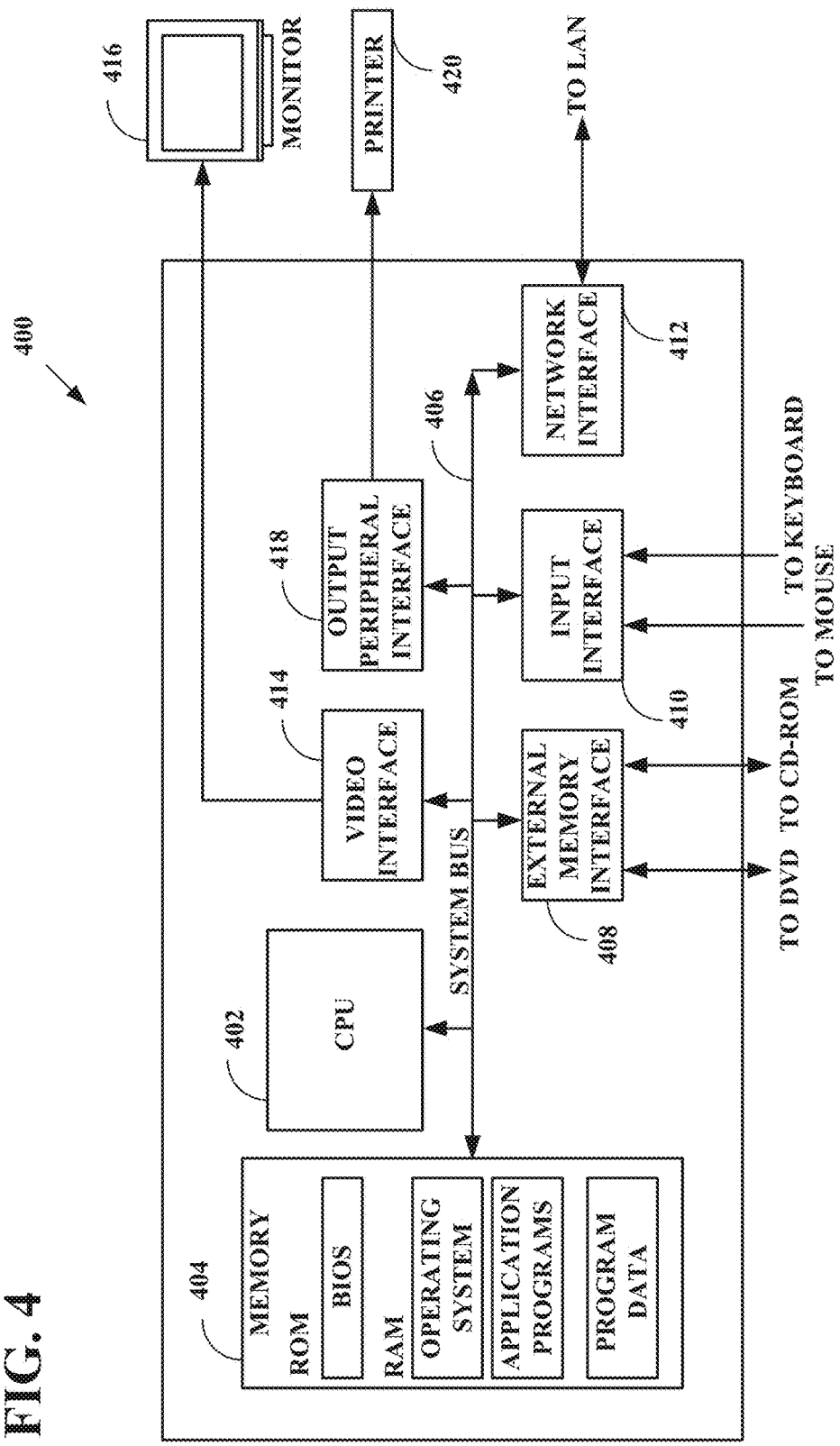
FIG. 4 is a diagram of a computer system 400, according to an embodiment.

FIG. 4 depicts an exemplary computer system comprising the structure for implementation of embodiments described above. Computer system 400 comprises a central processing unit (CPU) 402 that processes data stored in memory 404 exchanged via system bus 406. Memory 404 typically includes read-only memory, such as a built-in operating system, and random-access memory, which may include an operating system, application programs, and program data. Computer system 400 also comprises an external memory interface 408 to exchange data with a DVD or CD-ROM for example. Further, input interface 410 may serve to receive input from user input devices including but not limited to a keyboard and a mouse. Network interface 412 may allow external data exchange with a local area network (LAN) or other network, including the internet. Computer system 400 also typically comprises a video interface 414 for displaying information to a user via a monitor 416. An output peripheral interface 418 may output computational results and other information to output devices including but not limited to a printer 420.

Computer system 400 may comprise for example a personal computer or an engineering workstation, each of which is widely known in the art and is commonly used for integrated circuit design tasks, along with software products commercially available for performing computer-aided integrated circuit design tasks. Computer system 400 may also comprise a mobile computer, including for example a tablet computer or a smart phone. The computer system of FIG. 4 may for example receive program instructions, whether from existing software products or from embodiments of the present invention, via a computer program product and/or a network link to an external site.

For purposes of explanation, specific nomenclature is set forth to provide a thorough understanding of the present invention. Description of specific applications and methods are provided only as examples. Various modifications to embodiments will be readily apparent to those skilled in the art and the general principles defined herein may be applied to other embodiments and applications without departing from the spirit and scope of the invention. Thus the present invention is not intended to be limited to the embodiments shown, but is to be accorded the widest scope consistent with the principles and steps disclosed herein.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described with reference to operations that may be performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of embodiments may serve as the code segments directing a computing device to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention are possible. The invention is limited only by the scope of the appended claims.

What is claimed is:

1. A processor-implemented method for determining if a design for a circuit meets design specifications, so as to facilitate the provision of a manufacturable description of the circuit, the method comprising:
   using a processor:
   for each of the design specifications associated with the circuit,
     estimating a failure probability of each of a number of statistical samples using an initial performance model;
     simulating, in at least one Monte Carlo circuit design simulation, statistical samples in decreasing failure probability order using a computer-operated circuit simulation tool;
     selectively stopping the simulating when a worst statistical sample is found with a predetermined confidence level, wherein the worst statistical sample corresponds to a statistical sample, among the number of statistical samples, predicted to most likely fail the design specification;
     extracting the worst statistical sample; and
     determining if the worst statistical sample meets the design specification; and
   generating the manufacturable description of the circuit based on the determination.

2. The method of claim 1 further comprising similarly evaluating multiple design specifications individually during a design iteration.

3. The method of claim 1 further comprising:
   creating the initial performance model of the circuit design using an initial set of simulated statistical samples.

4. The method of claim 1 further comprising performing the simulating for each of the design specifications in a dynamically adjusted decreasing order of predicted design specification model accuracy.

5. The method of claim 1 further comprising re-using sample data from completed simulations to improve design specification model accuracy.

6. The method of claim 1 wherein criteria based on the predicted probability of unsimulated samples providing better performance than a currently worst statistical sample govern the stopping.

7. The method of claim 3 further comprising defining a maximum number of samples via a Clopper-Pearson binary search, with an initial upper bound estimate based on a design yield estimate.

8. A non-transitory computer readable medium storing instructions that, when executed by a processor, perform a method for determining if a design for a circuit meets design specifications, so as to facilitate the provision of a manufacturable description of the circuit, the processor-implemented method comprising:
- for each of the design specifications associated with the circuit,
  - estimating a failure probability of each of a number of statistical samples using an initial performance model;
  - simulating, in at least one Monte Carlo circuit design simulation, statistical samples in decreasing failure probability order using a computer-operated circuit simulation tool;
  - selectively stopping the simulating when a worst statistical sample is found with a predetermined confidence level, wherein the worst statistical sample corresponds to a statistical sample, among the number of statistical samples, predicted to most likely fail the design specification;
  - extracting the worst statistical sample; and
  - determining if the worst statistical sample meets the design specification; and
- generating the manufacturable description of the circuit based on the determination.

9. The medium of claim 8 further comprising instructions for similarly evaluating multiple design specifications individually during a design iteration.

10. The medium of claim 8 further comprising instructions for:
- creating the initial performance model of the circuit design using an initial set of simulated statistical samples.

11. The medium of claim 8 further comprising instructions for performing the simulating for each of the design specifications in a dynamically adjusted decreasing order of predicted design specification model accuracy.

12. The medium of claim 8 further comprising instructions for re-using sample data from completed simulations to improve design specification model accuracy.

13. The medium of claim 8 wherein criteria based on the predicted probability of unsimulated samples providing better performance than a currently worst statistical sample govern the stopping.

14. The medium of claim 10 further comprising instructions for defining a maximum number of samples via a Clopper-Pearson binary search, with an initial upper bound estimate based on a design yield estimate.

15. A system for determining if a design for a circuit meets design specifications, so as to facilitate the provision of a manufacturable description of the circuit, the system comprising:
- a memory storing executable instructions; and
- a processor executing instructions for:
  - for each of the design specifications associated with the circuit,
    - estimating a failure probability of each of a number of statistical samples using an initial performance model;
    - simulating, in at least one Monte Carlo circuit design simulation, statistical samples in decreasing failure probability order using a computer-operated circuit simulation tool;
    - selectively stopping the simulating when a worst statistical sample is found with a predetermined confidence level, wherein the worst statistical sample corresponds to a statistical sample, among the number of statistical samples, predicted to most likely fail the design specification;
    - extracting the worst statistical sample; and
    - determining if the worst statistical sample meets the design specification; and
  - generating the manufacturable description of the circuit based on the determination.

16. The system of claim 15 wherein the processor further executes instructions for similarly evaluating multiple design specifications individually during a design iteration.

17. The system of claim 15 wherein the processor further executes instructions for:
- creating the initial performance model of the circuit design using an initial set of simulated statistical samples.

18. The system of claim 15 wherein the processor further executes instructions for performing the simulating for each of the design specifications in a dynamically adjusted decreasing order of predicted design specification model accuracy.

19. The system of claim 15 wherein the processor further executes instructions for re-using sample data from completed simulations to improve design specification model accuracy.

20. The system of claim 15 wherein criteria based on the predicted probability of unsimulated samples providing better performance than a currently worst statistical sample govern the stopping.

* * * * *